Patented Apr. 19, 1927.

1,625,304

UNITED STATES PATENT OFFICE.

DOZIER FINLEY, OF BERKELEY, CALIFORNIA, ASSIGNOR TO THE PARAFFINE COMPANIES, INC., OF SAN FRANCISCO, CALIFORNIA, A CORPORATION OF DELAWARE.

EMULSION AND PROCESS OF MAKING THE SAME.

No Drawing. Application filed January 17, 1923. Serial No. 613,280.

My invention relates to the emulsification of bituminous materials particularly asphalts and one of the objects of the invention is the emulsification of the asphaltic mass with an aqueous mixture or solution containing a minimum of suspended or dissolved substances.

Another object is to prepare an emulsion with materials of definite composition such as calcium oxide or hydrate, and aluminum sulfate instead of employing clays or other mineral products, the composition of which varies widely and which cannot be tested for their adaptability except by empirical trials.

Another object is the provision of a process of emulsifying bituminous material which may more readily be carried out than processes of this character heretofore known, some of which present considerable difficulty.

Another object of my invention is the provision of a process for emulsifying bituminous material in which other material, such as crushed limestone, may be incorporated, so that a product of substantially equal value for many purpose but heavily filled with a less expensive ingredient, may be obtained. This product is useful in the production of a waterproof paper or felt such as is described in my copending application, Serial No. 613,279, filed January 17, 1923.

Still another object of the invention is the provision of an emulsion of the character described in which the materials in the water portion are low in weight, relatively inert chemically and generally insoluble.

My invention possesses other objects and features of advantage, some of which, with the foregoing, will be set forth in the following description of my invention. It is to be understood that I do not limit myself to the showing made by the said description, as I may adopt variant forms of my invention within the scope of the claims.

In the practice of my invention, I slake, for example, 40 pounds of quicklime with sufficient water to bring the mass to a plastic condition. The slaked lime is then transferred to a suitable mixer where it may be preferably beaten thoroughly rather than merely stirred. In the mixer the slaked lime is thinned out with boiling water until 41 gallons of water have been used altogether including that used in slaking. Additional water should be also added to compensate for that lost in evaporation.

The lime mixture is kept in agitation so that it is thoroughly homogeneous, and brought to a temperature which is just below the boiling point of water. I have found a temperature of 190° Fahrenheit to be quite satisfactory. At this temperature, a solution of 16 pounds of papermakers' alum, comprising aluminum sulfate, in 5 gallons of boiling water is added. This quantity is dependent on the material having in it substantially 17% of aluminum oxide.

The purpose of the salt is to effect a double precipitation from the mixture of insoluble aluminum hydroxide and the nearly insoluble calcium sulfate, and since insufficient alum is added for complete reaction with the lime, an excess of calcium hydroxide remains in the mixture. This produces a better emulsifying action than the completely neutralized mixture or one containing an excess of aluminum salt.

While continuing the thorough agitation of the material now in the mixer, and maintaining it at the previously stated temperature, I slowly add 400 pounds of D grade California asphalt, having a penetration of 50 by the method of The American Society for Testing Materials, Standards 1921, which has previously been brought to a temperature of about 190° Fahrenheit at which it is fluid. The fluid asphalt should be added at such a rate as to permit its thorough incorporation into the mixture. After incorporation of the asphalt, the resultant product is transferred to suitable containers or put directly to use, with or without cooling, since the emulsion is stable in either condition.

In place of aluminum sulfate, either of the iron sulfates may be used or ferrous sulfate may be oxidized in solution by the addition of the requisite amount of sulfuric acid and an oxidizing agent, say nitric acid, in a manner familiar to any manufacturing chemist. Or ferrous sulfate may be added to the water slaked lime with the formation of calcium sulfate and ferrous hydrate and this ferrous hydrate may be oxidized by the passage of carbon dioxide-free air through the mass. Or air containing the normal amount of carbon dioxide may be used and control of the calcium hydroxide exercised so that it shall be in excess at the end of the process. By excess is meant that there shall not alone be sufficient calcium hydroxide to saturate the total of the water in the emulsion at the time of completion, but there shall be undissolved calcium hydroxide in the mixture—in such a mixture as that above described, wherein aluminum sulfate was used to neutralize the lime, there is probably only about 10% of the lime which has actually been neutralized; in other words the excess of free lime is about 90%.

A smaller amount of lime may be used with good results; in place of 40 pounds, as little as 20 pounds has been used with good results. A calculation will show that even twenty pounds leaves an excess of lime far beyond that necessary to make the mix barely alkaline. Emulsions have been made with the asphalt-lime-alum formula with 20 pounds of lime neutralized to such a point that it will barely turn red litmus paper to a bluish color. With the commercial limes this point is reached when between 60 and 70 pounds of alum has been used. Emulsions have been made with lime-sulfuric acid-asphalt mix when the lime has been thoroughly neutralized with acid until blue litmus paper is reddened and then sufficient lime added back to turn red litmus paper to the blue color. However, it is preferred not to approach neutrality so closely; only in such instances as those in which a proportion of saponifiable ingredients may be present in the oils, bitumens or pitches which are used, or where calcium hydrate may be deemed harmful in the art where the emulsion is to be used—only in such instances will it usually be necessary to reduce the amount of free unslaked lime to a low figure.

Instead of 400 pounds of asphalt in the above procedure, as high as 700 pounds has been used with good results. With 20 pounds of lime and 16 pounds of alum, 500 pounds of asphaltum has been used without indication that the limit amount then had been employed.

Copper sulfate, or "bluestone," may be used in making this emulsion in exactly the same manner as the aluminum sulfate, but with this exception: Copper sulfate solution, added to a hot mixture of water slaked lime and water, breaks down into a dark brown or black copper oxide. If, however, the temperature is kept at or about 150° Fahrenheit, the copper hydroxide is produced in the normal manner—with only a slight break down, particularly on the surface where it comes in contact with the air—and the making of the emulsion may proceed as in the case of the aluminum sulfate formula. But, it is to be noted, that if the copper hydroxide has indeed broken down to the oxide, it has at any rate been removed from the water soluble state to an insoluble state, which complies with the spirit and intention of this process—i. e., the making of the materials in the water portion of the emulsion low in weight and relatively chemically inert and generally insoluble.

Chromium, zinc, manganese and magnesium sulfates have all been tried and have been found to work in precisely the same manner as the aluminum sulfate—manganese hydroxide oxidizes to a slight extent to manganese dioxide in contact with the air but this only follows the action of the copper, as above explained, and does not render it unfit for use in the process. Nickel and cobalt and cadmium sulfates have not been tried—they probably would work but have no commercial importance so far as can be seen.

Ammonium sulfate works in the process but it functions in an entirely different manner from any of the above mentioned reagents. When ammonium sulfate is added to calcium hydroxide, the solid, practically insoluble calcium sulfate is formed, but the other product of the reaction is a gas—ammonia, $NH_3$ which may be expelled from the mix by the heat specified in the above procedure. This, however, conforms to the conditions I desire to fulfill in the making of a medium for my emulsion—there is nothing left in the medium except relatively insoluble material.

Ammonium carbonate and ammonium oxalate behave in the same manner as the ammonium sulfate. The carbonates and oxalates of the heavier metals are in themselves insoluble and hence cannot be used.

Sulfuric acid may be used, and sulfuric anhydride, $SO_3$, and carbonic anhydride, $CO_2$, may also be used, the latter two in the form of fume and gas respectively. In the case of these three neutralizing agents, the products of the reaction are the calcium salt of the acid radical and water, which latter reaction product becomes a part of the water employed in the process.

It is true sodium and potassium sulfates and carbonates may be used to make an emulsion according to this process but their use gives rise to the production of caustic alkali which may not be desirable in many materials to be made from these emulsions;

consequently, it is preferred not to use them, except in instances where the presence of a caustic alkali is permissible or desired, though their use still may be considered as coming within the scope of this invention.

Substances other than the asphalt above specified may be emulsified by the process herein disclosed and other asphalts may likewise be emulsified. Petroleum grease, or petrolatum, may be so emulsified, oxidized asphalts, stearine pitches, coal tar, and asphalt oils, may be used in place of the particular asphalt designated in the above procedure.

An extremely valuable feature of this invention is that the asphalt, or other material to be emulsified, may have other materials mixed with it. In the example of the process given above, the amount of 400 pounds of asphalt may be replaced by a mixture of 200 pounds of the D grade asphaltum into which has been stirred 200 pounds of crushed limestone which has been screened through a 120-mesh screen—such a mixture has been tried and has been found to give a satisfactory emulsion, though it is one in which the emulsified particles of asphalt are much heavier and will sink much more readily in water. It is to be understood that in this emulsion, and in all others herein described there are many particles of considerable size—particles which would not pass through a 50-mesh sieve; such large particles are of no disadvantage in many arts, though it is not usual to consider particles of such size when speaking of an emulsion. It will be readily seen that with such particles it is very easy to have each asphaltic particle enclose one or more particles of a material such as powdered, limestone. In place of limestone, any one of a large number of powdered materials may be employed. It will be appreciated that mixtures of many of the above materials may be made. For instance, a light colored emulsion having germicidal properties may be made by using lime, aluminum sulfate, copper sulfate, petroleum grease and stearine pitch. Anyone acquainted with the nature of these materials may by proper selections, make emulsions for a wide variety of purposes.

It is clear, from all that has been said with regard to variations, that similar variations are possible with iron sulfate and all the other materials named—not alone those reacting chemically with the lime, but in the case, likewise, of the oils, asphalts, pitches or other bituminous matters.

Temperature may be adapted to the material used. Thus, to preserve copper hydroxide from decomposition a low temperature must be used. In this event the temperature influences the ingredients, in turn. For if a low temperature is employed, a low melting point bitumen or pitch must be used, it being necessary to have the bitumen, oil or pitch in an essentially liquid state when preparing the emulsion. But a temperature too much above the boiling point of water should be avoided as the bituminous material tends to form stringlets instead of minute spheres or globules if the temperature of the pitch or bitumen is too high.

The temperature of neutralization of the lime may be kept low, if desired. In fact the procedure here outlined did not indicate such a fact only because it is more convenient to carry the process through at a single temperature than to lower the temperature after slaking the lime, then raise it again for the emulsifying process. As a matter of fact it is to be expected that larger crystals of calcium sulfate are formed at an elevated temperature, meaning a lesser number of them and a decreased emulsifying power thus indicating a preference for a low temperature in the neutralizing process.

By "D" grade California asphalt is meant an asphalt derived from a petroleum of an asphaltic base by the process of distillation accompanied by the use of steam in the still, the asphalt to have a penetration of 15 to 50 at 77° F., by the method of The American Society for Testing Materials, Standard of 1921.

I claim:

1. An emulsion comprising the results of the mixture of calcium hydroxide, an agent capable of reacting with said hydroxide to produce a relatively insoluble compound, water, and a bituminous material.

2. An emulsion comprising the results of the mixture of calcium hydroxide, papermakers' alum, water and a bituminous material.

3. An emulsion comprising the results of the mixture of calcium hydroxide, an agent in an amount sufficient to neutralize only a portion of said hydroxide and reacting therewith to produce one or more insoluble or relatively insoluble compounds, water, and a bituminous material.

4. An emulsion comprising the results of the mixture of the following ingredients in the proportions stated:

| | |
|---|---|
| Calcium oxide | 20 to 40 pounds. |
| Papermakers' alum | 16 to 70 pounds. |
| Water | 45 to 50 gallons. |
| Bitumen | 200 to 700 pounds. |

5. An emulsion comprising the results of the mixture of the following ingredients in the proportions stated:

| | |
|---|---|
| Calcium oxide | 40 pounds. |
| Papermakers' alum | 16 pounds. |
| Water | 46 gallons. |
| Bitumen | 200 pounds. |
| Powdered filler | 200 pounds. |

6. An emulsion comprising the results of the mixture of the following ingredients in the proportions stated:

| | |
|---|---|
| Calcium oxide | 40 pounds. |
| Papermakers' alum | 16 pounds. |
| Water | 46 gallons. |
| Bitumen in which a powdered filler has been incorporated | 400 pounds. |

7. An emulsion comprising the results of the mixture of the following ingredients in the proportions stated:

| | |
|---|---|
| Calcium oxide | 40 pounds. |
| Papermakers' alum | 16 pounds. |
| Water | 46 gallons. |
| Bitumen | 200 pounds. |
| Crushed limestone | 200 pounds. |

8. The process of making a bituminous emulsion which comprises slaking lime with water, neutralizing a portion of the lime with an alum solution and precipitating aluminum hydroxide and calcium sulfate from the mixture, and slowly incorporating a bituminous material.

9. The process of making a bituminous emulsion which comprises slaking lime with water, maintaining the heat of the mixture and adding a hot solution of papermakers' alum in water, and slowly adding with agitation a hot bitumen.

10. The process of making a bitminous emulsion which comprises slaking lime with water, thinning the mixture with water, heating the thinned mixture to about 190° F. and adding a hot aqueous solution of alum during agitation of the whole, and slowly while continuing the agitation adding a hot bitumen.

11. The process of making a bituminous emulsion which comprises slaking from 20 to 40 pounds of quicklime, adding a solution of alum to neutralize a portion of the lime and precipitate aluminum hydroxide and calcium sulfate, and while agitating the mixture at a temperature of about 190° F. adding from 400 to 700 pounds of hot fluid bitumen.

12. The process of making a bituminous emulsion which comprises slaking lime with water, neutralizing a portion of the lime with an alum solution and precipitating aluminum hydroxide and calcium sulfate from the mixture, and slowly incorporating a bituminous material in which a filler has been previously incorporated.

13. The process of making a bituminous emulsion which comprises slaking lime with water, neutralizing a portion of the lime with an alum solution and precipitating aluminum hydroxide and calcium sulfate from the mixture, and slowly incorporating a bituminous material in which crushed limestone has been previously incorporated.

14. The process of making a bituminous emulsion which comprises slaking lime with water, thinning the mixture with water, heating the thinned mixture to about 190° F. and adding a hot aqueous solution of alum during agitation of the whole, and slowly while continuing the agitation adding a hot bitumen in which a filler has been previously incorporated.

15. The process of making a bituminous emulsion which comprises slaking 40 pounds of quicklime, thinning the material and adding under conditions of heat and agitation 16 pounds of alum in aqueous solution to produce a bulk of about 45 gallons, and continuing the heat and agitation while adding 400 pounds of hot fluid bitumen.

16. The process of making a bituminous emulsion which comprises slaking 40 pounds of quicklime, thinning the material and adding under conditions of heat and agitation 16 pounds of alum in aqueous solution to produce a bulk of about 45 gallons, and continuing the heat and agitation while adding 400 pounds of a mixture comprising a hot fluid bitumen in which a powdered filler has been incorporated.

17. The process of making a bituminous emulsion which comprises slaking 40 pounds of quicklime, thinning the material and adding under conditions of heat and agitation 16 pounds of alum in aqueous solution to produce a bulk of about 45 gallons, and continuing the heat and agitation while adding 400 pounds of a mixture comprising a hot fluid bitumen and powdered limestone.

18. An emulsion comprising calcium hydroxide, an agent capable of reacting with said hydroxide to produce a relatively insoluble compound, water, a bituminous material, and a filler.

In testimony whereof, I have hereunto set my hand.

DOZIER FINLEY.